United States Patent [19]

Yonekura

[11] Patent Number: 4,510,570
[45] Date of Patent: Apr. 9, 1985

[54] CONTROL SYSTEM FOR PRESSES

[75] Inventor: Mikio Yonekura, Odawara, Japan

[73] Assignee: Amada Company Limited, Isehara, Japan

[21] Appl. No.: 406,170

[22] Filed: Aug. 9, 1982

[30] Foreign Application Priority Data

Aug. 12, 1981 [JP] Japan ................................ 56-125257

[51] Int. Cl.³ ........................ G06F 15/46; B21D 5/02
[52] U.S. Cl. .................................... 364/476; 364/142; 72/21
[58] Field of Search ............... 364/476, 511, 519, 131, 364/142, 189; 72/8, 9, 11, 12, 21-26

[56] References Cited

U.S. PATENT DOCUMENTS

| | | | |
|---|---|---|---|
| 3,618,349 | 11/1971 | Roch | 364/476 |
| 3,831,425 | 8/1974 | Kita | 72/24 X |
| 4,148,203 | 4/1979 | Farazandeh et al. | 72/21 |
| 4,177,517 | 12/1979 | Mette et al. | 364/476 X |
| 4,215,398 | 7/1980 | Burkett et al. | 364/134 X |
| 4,280,182 | 7/1981 | Mickowski | 364/475 |
| 4,358,945 | 11/1982 | Partzel | 72/26 X |
| 4,408,281 | 10/1983 | Tack, Jr. et al. | 364/476 |
| 4,408,471 | 10/1983 | Gossard et al. | 364/476 |

FOREIGN PATENT DOCUMENTS 2094999 9/1982 United Kingdom ................ 364/476

Primary Examiner—Edward J. Wise
Attorney, Agent, or Firm—Wigman & Cohen

[57] ABSTRACT

A central system for operating presses utilizing one or plural microcomputers is disclosed in which the rotational angle of, for example, the crankshaft of the press is monitored and used to initiate the operation of programmed movements of the press. When utilizing plural microcomputers, they are operated synchronously, a pulse is developed in accordance with the outputs of each, and this pulse is utilized to control the press.

7 Claims, 7 Drawing Figures

CONTROL SYSTEM FOR PRESSES

BACKGROUND OF THE INVENTION

1. Field of the Invention

The present invention relates to improved control systems for presses and, more particularly, pertains to digital and analog microcomputer control systems for presses.

2. Description of the Prior Art

The conventional control systems for presses have been provided with sequential circuits which are of a controlled contact or contact-less type. The sequential circuits of the controlled contact type such as sequential relay circuits are subject to wear and therefore are liable to be shortlived. Both of these types of sequential circuits are lacking in safety and reliability and therefore have been multitudinously or plurally designed. Accordingly, the conventional sequential circuits have become complex in construction, bulky in size and costly in manufacture and assembly. Also, it has been necessary and time-consuming to change the wiring and the circuit boards when it is desired to change control methods in these conventional control systems.

Furthermore, these prior art devices have the disadvantage that their safety systems often fail to work in emergencies.

SUMMARY OF THE INVENTION

It is a general object of the present invention to provide a control system for controlling presses by means of microcomputers.

More particularly, it is an object of the present invention to provide a control system for controlling presses by means of microcomputers so that safety can be always maintained in case of failure of the circuitry.

It is another object of the present invention to provide a simple control system which is compact in construction and is low in cost.

It is a further object of the present invention to provide a control system in which control methods can be easily changed by changing control programs.

According to the present invention, in order to control a press, a microcomputer is previously inputted with controlling programs so that it may give commands to the press at each position of the movement of the driving means of the press.

It is a still further object of the present invention to provide a control system which can control presses without decreasing or interfering with the responses of the controlling means of the presses.

Other and further objects and advantages of the present invention will be apparent from the following description and accompanying drawings which, by way of illustration, show preferred embodiments of the present invention and the principles thereof.

DESCRIPTION OF THE PREFERRED EMBODIMENTS

Figure 1:
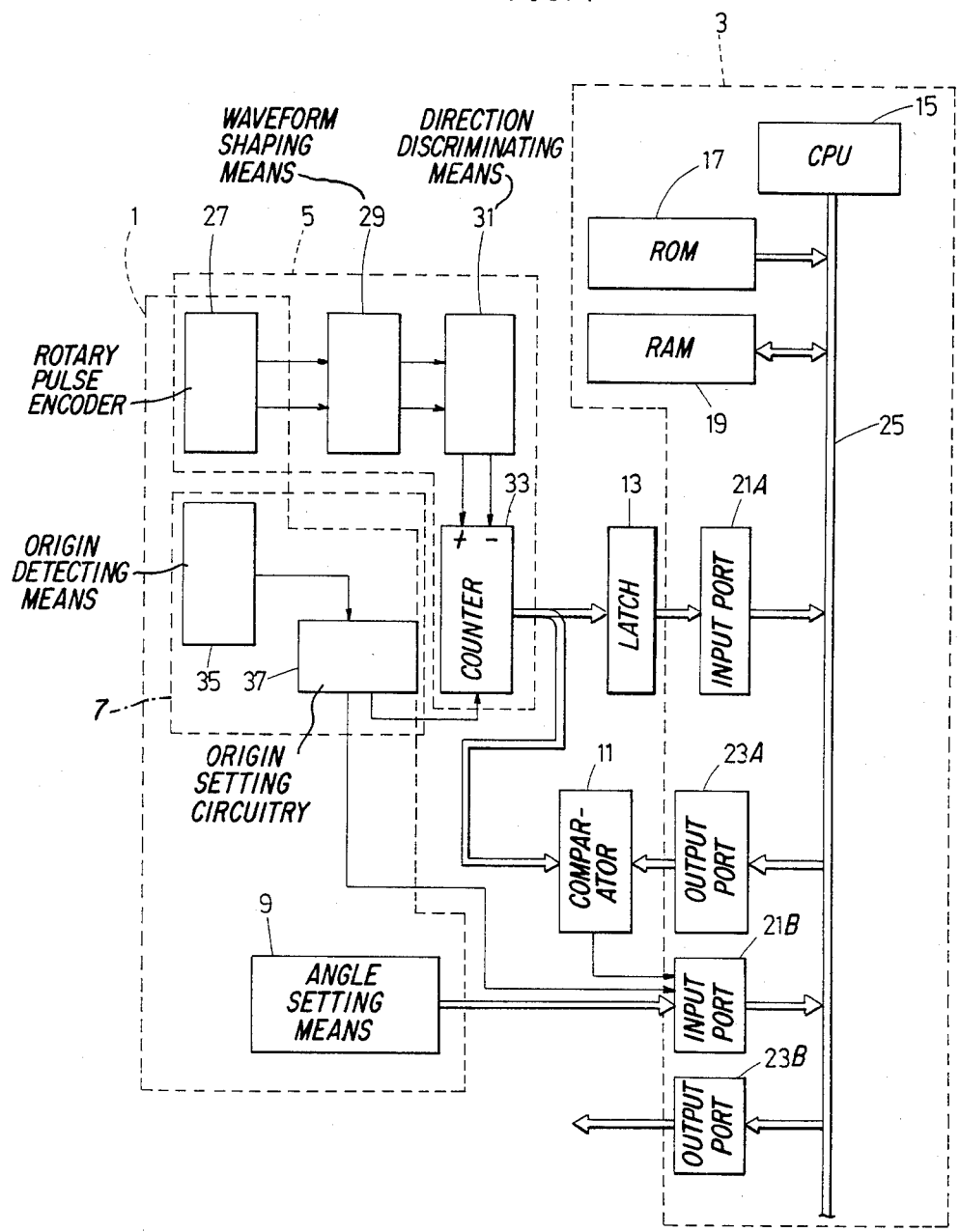
FIG. 1 is a block diagram of a control system for controlling presses by means of a microcomputer according to the present invention.

Referring to FIG. 1, there is shown a control system which is so arranged as to give commands to a press 1 (schematically shown by imaginary lines) in accordance with the rotational angles or positions of a driving means such as a crankshaft of the press. The control system is connected to the press and comprises a microcomputer 3, an angle detecting means 5, an origin setting means 7, an angle setting means 9 such as a keyboard, a comparator 11 and a latch 13.

The microcomputer 3 is connected to the press and comprises a CPU (Central Processing Unit) 15, a ROM (Read Only Memory) 17 in which programs are stored, and a RAM (Random Access Memory) 19 for temporally storing data. Also, the microcomputer 3 further comprises a plurality of input ports 21A and 21B for inputting data from external devices, a plurality of output ports 23A and 23B for outputting data to the external devices and a system bus 25 which connects the CPU 15, the ROM 17, the RAM 19, the input ports 21A and 21B and the output ports 23A and 23B to transmit data within the microcomputer 3.

The angle detecting means 5 comprises a rotary pulse encoder 27, a wave-form shaping means 29, a direction discriminating means 31 and a counter 33 which is provided with input terminals "+" (plus) and "−" (minus). The rotary pulse encoder 27 is mounted on a rotary driving means such as a crankshaft of the press to detect the rotational angles of the driving means and transmit them as pulse signals to the wave-form shaping means 29. The wave-form shaping means 29 is connected to the rotary pulse encoder 27 to convert the wave-form of the pulse signals sent from the rotary pulse encoder 27 to pulse signals of regular forms and provide them to the direction discriminating means 31 which is connected thereto. The direction discriminating means 31 is so arranged as to discriminate the direction of the rotation of the driving means based upon the pulse signals sent from the waveform shaping means 29 and transmit the pulse signals to either of the terminals "+" and "−" of the counter 33, depending upon the direction discriminated. The counter 33 is connected to the direction discriminating means 31 to count the pulse signals to obtain the rotational angles of the driving means and transmit them to either of the comparator 11 and the latch 13 as will be described hereinafter.

The origin setting means 7 is provided near the driving means of the press and comprises an origin detecting means 35 such as a proximity switch and dog and origin setting circuitry 37. The origin detecting means 35 is so arranged as to detect the top dead center of the driving means as the origin and to send a signal to the origin setting circuitry 37 when the driving means is at the top dead center, which is the origin. The origin setting circuitry 37 is connected to the origin detecting means 35 and also to the counter 33 and the input port 21B which is connected to the CPU 15 via the system bus 25. The origin setting circuitry 37 is so arranged as to transmit signals to the counter 33 and to the CPU through the input port 21B upon receiving from the origin detecting means 35 a signal indicating that the driving means is at top dead center. Also, the counter 33 is so designed as to be cleared as soon as it receives the signal from the origin setting circuitry 37.

The angle setting means 9 is connected to the input port 21B so that the angles of the driving means and the operations of the press at the respective angles can be stored in the microcomputer 3.

The comparator 11 is connected to the counter 33 and the output port 23A to compare the actual rotational angle of the driving means provided by the counter 33 and the programmed angle stored in the microcomputer 3. Also, the comparator 11 is connected to the input port 21B so as to send a signal to the CPU through the input port 21B when the programmed angle stored in the computer 3 is equal to the actual rotational angle of the driving means.

The latch 13 is provided between the counter 33 and the input port 21A to temporally maintain the angle provided by the counter 33 and provide the same angle to the CPU 15 through the input port 21A.

In the above described arrangement, the angles of the driving means of the press and the operations of the press at the respective angles are inputted from the angle setting means to the microcomputer 3 and are stored in the RAM 19 after being processed by the CPU 15 according to the program which has been stored in the ROM 17. When the press is to be put into operation, the driving means such as the crankshaft is set to top dead center so as to cause the origin setting means 7 to clear the counter 33 and send to the CPU 15 through the input port 21B a signal indicating that the driving means is at the top dead center. As soon as the press is put into motion, the first rotational angle of the driving means is transmitted from the RAM 19 to the comparator 11 through the output port 23A under instructions from the CPU 15. Also the actual rotational angle of the driving means is provided by the counter 33 to the comparator 11. Then, when the first rotational angle of the driving means provided by the microcomputer 3 is equal to the actual rotational angle of the same provided by the counter 33, the comparator 11 will provide the same angle to the CPU 15 through the input port 21B. Thus the CPU 15 will instruct the press to perform an operation which is to be done at the angle of the driving means. In this arrangement, as the driving means of the press rotates around 360°, the similar actions are continuously performed at each angle of the driving means under the programs stored in the microcomputer 3 until an operating cycle of the press is completed, and then these same cycles are repeated. Also, when the latch 13 is used instead of the comparator 11, the arrangement is such that the CPU 15 reads the actual rotational angle of the driving means by means of the latch 13 and compares it with the rotational angle which has been stored in the RAM 19.

Figure 2:
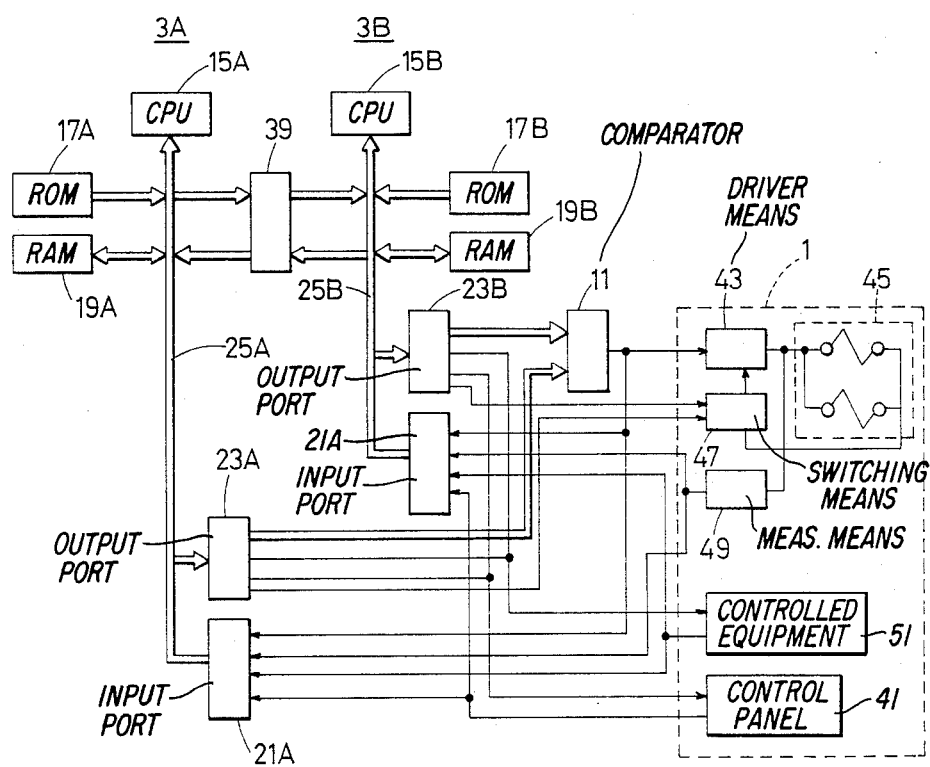
FIG. 2 is a block diagram of another control system for controlling presses by means of plural microcomputers according to the present invention.

Referring to FIG. 2, there is shown another control system which includes two computers 3A and 3B which are more or less the same in construction and function as the computer 3 in the control system shown in FIG. 1 used to control the press 1. In more or less the same manner as the computer 3 shown in FIG. 1, the computers 3A and 3B comprise CPUs 15A and 15B, ROMs 17A and 17B, RAMs 19A and 19B, input ports 21A and 21B, output ports 23A and 23B and system buses 25A and 25B, respectively. The two computers 3A and 3B are connected with each other by a data transfer means 39 so that they may exchange data to synchronize with each other. Also, comparator 11 is provided which is connected to both of the output ports 23A and 23B in order to compare the data of the computer 3A with that of the computer 3B.

As is also shown in FIG. 2, the input ports 21A and 21B and the output ports 23A and 23B are connected to a control panel 41 which is connected to or mounted on the press 1 and contains operating controls, indicators and readouts. The comparator 11 is connected to the input ports 21A and 21B, and is also further connected to a driver means 43, such as an inverter, which is connected to or mounted on the press 1. The driver means 43 is connected at its output side to a loading means 45, such as a solenoid, which has been incorporated into the press 1 to control the driving means, such as the crankshaft of the same. There is provided a switching means 47 which is connected in series to the loading means 45 and is also further connected to the output ports 23A and 23B so as to increase the response of the press 1, although the switching means 47 can be omitted as will be seen hereinafter. Also, there is provided a current and voltage measuring means 49 which is connected between the driver means 43 and the loading means 45 and is also connected to the input ports 21A and 21B. Furthermore, the input ports 21A and 21B are connected directly or via the comparator 11 to various controllable means 51 such as loading and unloading apparatus.

The driver means 43 is so arranged as to receive an alternating signal from the microcomputers 3A and 3B through the comparator 11 when the microcomputers 3A and 3B provide a starting signal to put the loading means 45 into motion. The arrangement is such that the driving means 43 will rectify and smooth the wave-form of the signal sent from the microcomputers 3A and 3B to change the alternating wave into a direct one so that a direct current will be supplied into the loading means 45. Also, the loading means 45 is so arranged as to be put into motion when the current supplied from the driver means 43 has reached a preset voltage. As will be readily apparent to those skilled in the art, the voltage in the loading means 45 is increased as the period of the alternating signal from the microcomputers 3A and 3B is decreased. Also, it will be understood that the response of the loading means 45 can be increased when the driver means 43 is previously provided with a signal having a period which is comparatively longer but is shorter than that at the voltage beyond which the loading means 45 is put into motion.

In this connection, the switching means 47 is provided between the driver means 43 and the loading means 45 in order to reduce the response of the loading means 45 when the microcomputers 3A and 3B produce a stop signal to stop the loading means 45. Thus, it will be understood that the switching means 47 will be inputted with a stop signal to cut the current being supplied into the loading means 45 as soon as the stop signal is produced by the microcomputers 3A and 3B to stop the loading means 45.

Figure 3:
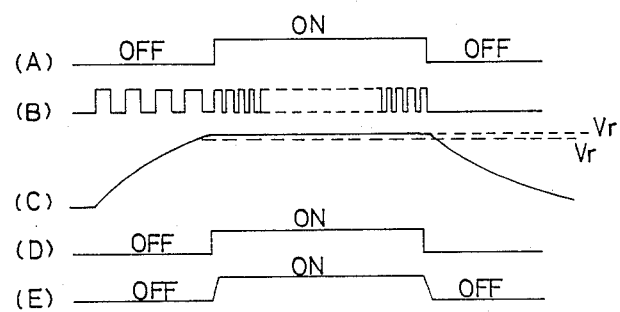
FIGS. 3 and 4 are timing diagrams of the control system for presses shown in FIG. 2.

Referring to FIG. 3, the above description will be more clearly understood from the timing diagram which shows the function of the control system. Particularly, the timing diagram of FIG. 3 shows the signal (A) for moving the loading means 45, the signal (B) to be inputted into the driver means 43, the voltage (C) applied to the loading means 45, the operation (D) of the switching means 47 and the operation (E) of the loading means 45. Also, in FIG. 3, "ON" shows the state in which the loading means 45 is to be moved, and "OFF" shows the state in which the loading means 45 is to be stopped.

As seen from FIG. 3, the pulses of (B) will have a long period for a time until (A) changes to "ON" from "OFF". (C) will go up gradually to a preset level shown by the dotted line and then will be maintained at the same level until (A) changes to "ON". As soon as (A) becomes "ON", the pulses of (B) will have shortened periods, and then (C) will go up beyond the preset level. At this time, (D) will become "ON" so that (B) will become "ON". Also, as soon as (A) becomes "OFF", (B) will become null and (C) will begin to gradually decrease, and as the result (D) will change to "OFF" to make (E) "OFF".

In operations in the above described arrangement, the two microcomputers 3A and 3B are operated not only to control the various operations of the press 1 but also to make a signal for putting the loading means 45 into motion and at the same time check troubles in themselves and the comparator 11.

Figure 5A:
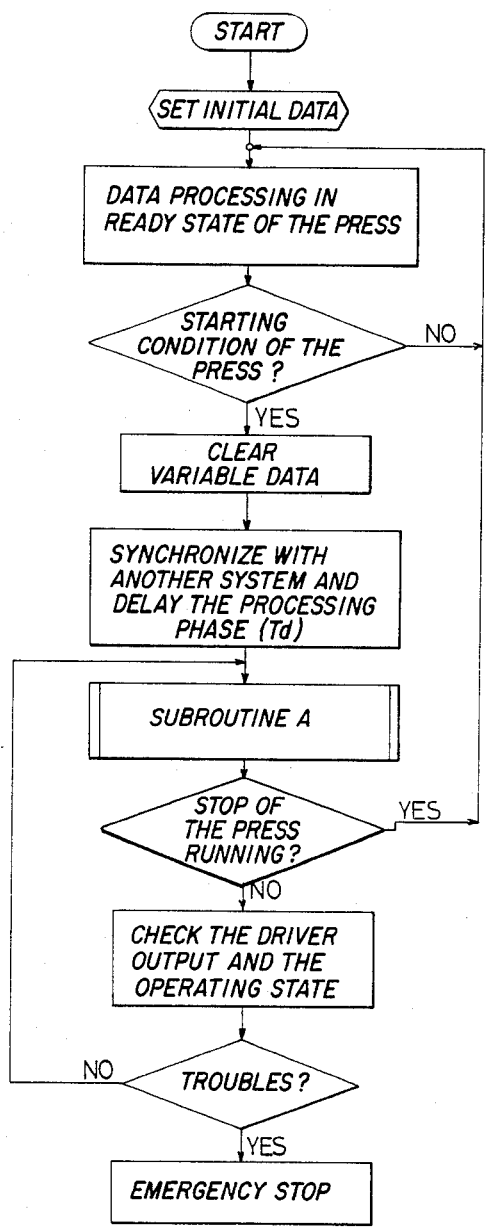
FIGS. 5A, 5B and 5C are program flow charts of a control system for presses by means of the plural microcomputers shown in FIG. 2.
Figure 5B:
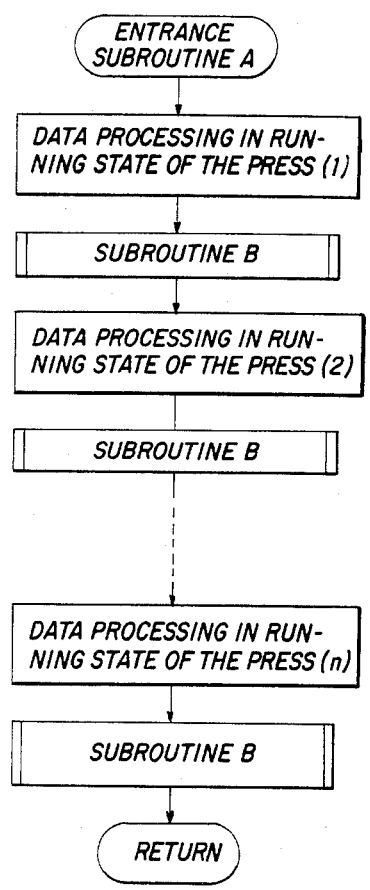
Figure 5C:
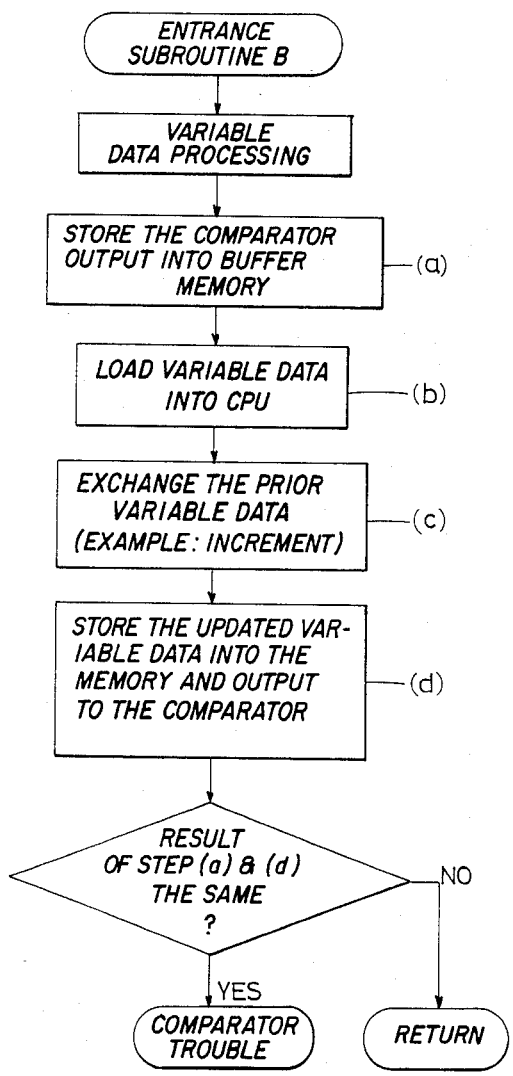

Referring to FIGS. 5A, 5B and 5C, the microcomputers 3A and 3B are initially operated to begin to perform the programs of the above described control system at a starting signal from the control panel 41. Operational conditions are checked and then sset and the press 1 is then put into motion when the operational conditions are satisfied. After beginning the program, the microcomputers 3A and 3B will initially clear variable data stored in the microcomputers 3A and 3B and then synchronize their processing periods and also lag processing phases by a certain period or time (Td) for processing during operations of the press 1. The above described procedures will be repeated until the conditions for stopping the press 1 are satisfied in the microcomputers 3A and 3B.

Figure 4:
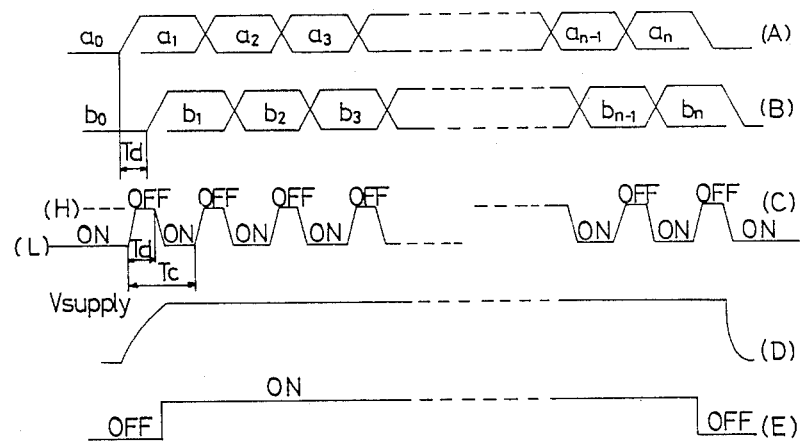

Referring to FIG. 4, the operations of the press 1 can be understood from the timing diagram showing the control system for transmitting the pulse signals to the driver means 43 to move the loading means 45. Particularly, the timing diagram of FIG. 4 shows variable data (A) of the microcomputer 3A consisting of variables $a_0$, $a_1, \ldots a_n$, variable data of the microcomputer 3B consisting of variables $b_0, b_1, \ldots b_n$, the output (C) of the comparator 11, the voltage (D) applied to the loading means 45 and the operation (E) of the same. Also, "OFF" shows the state in which the contents of the comparator 11, that is (A) and (B), do not coincide with each other with the high level (H). "ON" shows the state in which the contents of the comparator 11, that is (A) and (B), coincide with each other and with the low level (L). In this connection, the following formulas can be used:

$$a_n = b_n \ (n: 1, 2, 3 \ldots n)$$
$$a_1 \neq a_2 \neq \ldots \neq a_n$$

During the operations of the press 1, the variable data ($a_0$) of the microcomputer 3A is initially transformed to the variable data ($a_1$) in the microcomputer 3A and (C) will become "OFF" since the variable data ($a_1$) is not equal to the variable data ($b_0$) of the microcomputer 3B. Next, the variable data ($b_0$) of the microcomputer 3B is transformed to the variable data ($b_1$) after the time lag (Td) of a quarter period and therefore (C) will become "ON" since the variable data ($a_1$) is equal to the variable data ($b_1$). This processing is repeated during the operations of the press 1 so that the comparator 11 can send to the driver means 43 the signals as shown by (C) in FIG. 4. Thus, it will be understood that (D) will go up beyond the threshold so as to enable the loading means 45 to work as shown by (E). Also, it will be understood that the microcomputers 3A and 3B can perform various procedures necessary to the operations of the press 1 during the idle time when the variable data such as ($a_n$) and ($b_n$) are not transformed.

In the above described arrangement, the variable data processing cannot be normally performed to make (A) and (B) equal when any troubles occur in the system, since it is performed by all the functions of the microcomputers 3A and 3B and the comparator 11. Accordingly, when any troubles occur in the system, normal pulse signals to be sent to the driver means 43 cannot be maintained and as a result the loading means 45 cannot work.

Although a preferred form of the present invention has been illustrated and described, it should be understood that the device is capable of modification by one skilled in the art without departing from the principles of the invention. Accordingly, the scope of the invention is to be limited only by the claim appended hereto.

I claim:

1. A method for controlling a press by means of a microcomputer, comprising the steps of:
   (a) generating a signal from a rotational angle detector mounted on a rotary driving means of said press;
   (b) comparing the rotational angle detector signal with a predetermined stored rotational angle signal;
   (c) storing a signal in said microcomputer when said rotational angle detector and predetermined stored signals coincide with each other; and
   (d) actuating said press by means of said microcomputer executing a program stored therein upon the performance of said storing step (c) such that said press performs a desired preprogrammed operation.

2. The method of claim 1, wherein said rotary driving means of said press comprises a crankshaft and said rotational angle detector includes a rotary pulse encoder mounted to said crankshaft for detecting the rotational angle of said crankshaft.

3. The method of claim 1 wherein the said rotational angle detector detects a position of a slide member of a press.

4. A method for controlling a press by means of first and second microcomputers, comprising the steps of:
   (a) storing identical operational data in first and second microcomputers;
   (b) delaying the phase of the first operational data relative to the second operational data;
   (c) exchanging said operational data between said first and second microcomputers after the completion of each processing cycle of the press;
   (d) storing said exchanged operational data in each of the respective first and second microcomputers;
   (e) comparing said stored exchanged data with said stored operational data to generate a stop signal when said stored exchanged and stored operational data do not coincide; and
   (f) stopping said press when said stop signal is generated.

5. The method of claim 4, further including the steps of generating a go signal upon comparing said stored exchanged and stored operational data when said compared data coincide and actuating said press upon the generation of said go signal.

6. The method of claim 4, further including the steps of:
   (a) generating a signal from a rotational angle detector mounted on a rotary driving means of said press;
   (b) comparing the rotational angle detector signal with a predetermined stored rotational angle signal;
   (c) storing a signal in said first and second microcomputers when said rotational angle detector and predetermined stored signals coincide with each other; and
   (d) actuating said press by means of said microcomputers executing a program stored therein upon the performance of said storing step (c) such that said press performs a desired preprogrammed operation.

7. Apparatus for controlling a press, comprising:
   (a) microcomputer means for producing first and second signals for actuating and stopping said press;
   (b) driver means for receiving said first signal for generating a driving signal;
   (c) loading means connected to receive said driving signal from said driver means and to actuate said press; and
   (d) switching means connected between said driver means and said loading means for receiving said second signal from said microcomputer means for actuating said loading means to stop said press upon receiving said second signal.

* * * * *